(12) United States Patent
Sweet et al.

(10) Patent No.: US 11,489,364 B2
(45) Date of Patent: Nov. 1, 2022

(54) CONTROL OF POWER GENERATION SYSTEM DURING ONLINE MAINTENANCE USING MULTIPLE MAINTENANCE MODES

(71) Applicant: General Electric Company, Schenectady, NY (US)

(72) Inventors: Bryan Edward Sweet, Valatie, NY (US); Christian-Anghel Solacolu, Cravanche (FR); Melinda Stephanie Ammerman, Simpsonville, SC (US); Bret Stephen Dalton, Greer, SC (US)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 16/935,318

(22) Filed: Jul. 22, 2020

(65) Prior Publication Data

US 2022/0029454 A1 Jan. 27, 2022

(51) Int. Cl.
*H02J 13/00* (2006.01)
*H02J 3/00* (2006.01)

(52) U.S. Cl.
CPC ...... *H02J 13/00006* (2020.01); *H02J 3/0012* (2020.01); *H02J 3/0073* (2020.01); *H02J 13/00002* (2020.01); *H02J 13/00004* (2020.01); *H02J 2203/10* (2020.01)

(58) Field of Classification Search
CPC .. H02J 13/00006; H02J 3/0012; H02J 3/0073; H02J 13/00002; H02J 13/00004; H02J 2203/10; F05D 2230/72; F05D 2260/80; F05D 2270/095; F01D 21/003
See application file for complete search history.

(56) References Cited

U.S. PATENT DOCUMENTS

| | | | | |
|---|---|---|---|---|
| 3,911,286 A | * | 10/1975 | Uram | F01D 17/24 290/40 R |
| 4,445,180 A | * | 4/1984 | Davis | F01D 17/24 290/40 R |
| 4,455,614 A | * | 6/1984 | Martz | F01K 23/10 290/40 R |

(Continued)

OTHER PUBLICATIONS

European Search Report and Written Opinion for corresponding EP Application No. 21185952 dated Sep. 27, 2021, 14 pages.

*Primary Examiner* — Ziaul Karim
(74) *Attorney, Agent, or Firm* — James Pemrick; Charlotte Wilson; Hoffman Warnick LLC (57) ABSTRACT

Embodiments of the disclosure provide a method for controlling a power generation system during on-line maintenance. The method includes operating the power generation system in a first maintenance mode, which causes a controller of the power generation system to disable an automated response to at least one operational fault of the power generation system; monitoring a risk parameter of the power generation system or at least one sensor within the power generation system while operating the power generation system in the first maintenance mode; and operating the power generation system in a second maintenance mode in response to detecting an override command, an elapsed time exceeding a time limit, or the monitored risk parameter exceeding a safety threshold. The second maintenance mode causes the controller of the power generation system to enable the automated response to the at least one operational fault of the power generation system.

20 Claims, 4 Drawing Sheets

(56) References Cited

U.S. PATENT DOCUMENTS

| | | |
|---|---|---|
| 9,366,192 B2 | 6/2016 | Byrd et al. |
| 2004/0199351 A1* | 10/2004 | Ott .................... G05B 23/0256 714/E11.169 |
| 2009/0234512 A1* | 9/2009 | Ewing .................... G05B 15/02 700/295 |
| 2012/0026482 A1* | 2/2012 | Dailey .................... G01L 1/242 356/43 |
| 2014/0025211 A1* | 1/2014 | Cheim .............. H02J 13/00002 700/286 |
| 2015/0226128 A1* | 8/2015 | Byrd ........................ G01N 1/26 454/252 |

* cited by examiner

CONTROL OF POWER GENERATION SYSTEM DURING ONLINE MAINTENANCE USING MULTIPLE MAINTENANCE MODES

BACKGROUND

The disclosure relates generally to the operation of power generation systems. More specifically, embodiments of the disclosure provide a methodology for controlling a power generation system during on-line maintenance operations, by providing multiple maintenance modes.

Power generation systems, also known as power plants, typically include a variety of different systems (e.g., turbomachine, generator, and/or other interconnected assemblies) that are used to generate a power output. Such power plants may include a power source (e.g., a turbomachine, solar panel, nuclear reactor, etc.), a prime mover (e.g., a rotatable shaft or similar element) for coupling the power source to an electric generator, and/or various components of the electric generator. For instance, a power generation system may include a gas turbine assembly having a compressor coupled to a gas turbine. The gas turbine in turn may be coupled to and drive a generator mounted on the same shaft. The generator produces a power output.

Power generation systems are designed and built to operate over a period of several years. Over this time, the aging and continued use of a power generation system will pose a need for maintenance of the power generation system and its components, e.g., repair, replacement, upgrading, and/or other types of servicing. Given the constant demand for power by customers of the electrical infrastructure, it is undesirable to completely shut down the system to undergo "off-line" maintenance except when absolutely necessary. Many power generation systems allow for operation in a "maintenance setting," i.e., a setting in which the power generation system continues to produce power at a modified output. Operation in a maintenance setting may be possible during periods of lower demand. When a power generation system operates in this setting, targeted components or parts are repaired (e.g., mechanically repaired or purged of contaminants), replaced, upgraded, etc. Maintenance of a power generation system in this state is known as "on-line maintenance."

The on-line maintenance setting featured in several power generation systems may face technical challenges that limit its effectiveness. For example, many systems for monitoring variables such as concentrations of hazardous fluids, or other variables such as shaft speed, fluid pressure, magnitude of vibrations, etc., may trigger a start to on-line maintenance in response to minor anomalies. When such anomalies are not indicative of larger systemic problems, transitions into and/or out of on-line maintenance consumes considerable time and cost in the form of lost power output, servicing time, purchasing of parts and/or repair equipment, etc. Increasing the thresholds for each monitored variable to reduce "false positives" may cause systemic issues to be left unchecked. In extreme situations, the reduced management of systemic faults require a shutdown of the power generation system for off-line maintenance.

BRIEF DESCRIPTION

Aspects of the disclosure provide a method for controlling a power generation system during on-line maintenance, the method including: operating the power generation system in a first maintenance mode, wherein the operating the power generation system in the first maintenance mode causes a controller of the power generation system to disable an automated response to at least one operational fault of the power generation system; monitoring a risk parameter of the power generation system or at least one sensor within the power generation system while operating the power generation system in the first maintenance mode; and operating the power generation system in a second maintenance mode in response to detecting an override command, an elapsed time in the first maintenance mode exceeding a time limit, or the monitored risk parameter exceeding a safety threshold, wherein operating the power generation system in the second maintenance mode causes the controller of the power generation system to enable the automated response to the at least one operational fault of the power generation system.

Further aspects of the disclosure provide a program product stored on a computer readable storage medium for controlling a power generation system during on-line maintenance, the computer readable storage medium including program code for causing a computer system to perform actions including: operating the power generation system in a first maintenance mode, wherein the operating the power generation system in the first maintenance mode causes a controller of the power generation system to disable an automated response to at least one operational fault of the power generation system; monitoring a risk parameter of the power generation system or at least one sensor within the power generation system while operating the power generation system in the first maintenance mode; and operating the power generation system in a second maintenance mode in response to detecting an override command, an elapsed time in the first maintenance mode exceeding a time limit, or the monitored risk parameter exceeding a safety threshold, wherein operating the power generation system in the second maintenance mode causes the controller of the power generation system to enable the automated response to the at least one operational fault of the power generation system.

Additional aspects of the disclosure provide a system including: a power generation system configured to operate in an on-line maintenance setting; a system controller in communication with the power generation system, the system controller being configured to perform actions during operation of the power generation system in the on-line maintenance setting, the actions including: operate the power generation system in a first maintenance mode, wherein the operating the power generation system in the first maintenance mode causes a controller of the power generation system to disable an automated response to at least one operational fault of the power generation system; monitor a risk parameter of the power generation system or at least one sensor within the power generation system while operating the power generation system in the first maintenance mode; and operate the power generation system in a second maintenance mode in response to detecting an override command, an elapsed time in the first maintenance mode exceeding a time limit, or the monitored risk parameter exceeding a safety threshold, wherein operating the power generation system in the second maintenance mode causes the controller of the power generation system to enable the automated response to the at least one operational fault of the power generation system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within the various systems, components, and other embodiments of the disclosure. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the present disclosure provide methods, program products, and systems for operating a power generation system in a maintenance setting. Methods according to the disclosure use multiple maintenance modes to allow the power generation system to operate in a first maintenance mode, without at least one automated response to an operational fault of the power generation system (i.e., automatic shutdowns, changes in firing rate, temperature, pressure etc.). While operating in the first maintenance mode, one or more sensors of the power generation system may monitor various risk parameters, e.g., chemical parameters such as gas concentrations, mechanical parameters such as shaft speed, and/or electrical parameters such as power output. In this state, any one of several conditions may cause the power generation system to transition from operating in the first maintenance mode to operating in a second maintenance mode. For example, detecting an override command, operating in the first maintenance mode for longer than a time limit, and/or one of the monitored risk parameters exceeding a safety threshold, may cause the power generation system to operate in the second maintenance mode. In the second maintenance mode, a controller of the power generation system re-enables the automated response to the operational fault(s), thereby causing the power generation system to be more sensitive to various maintenance scenarios. Methods according to the disclosure thus permit a limited amount of operation with a more permissive form of monitoring, while ensuring safety by automatically restoring a preventative response to an operational risk.

Figure 1:
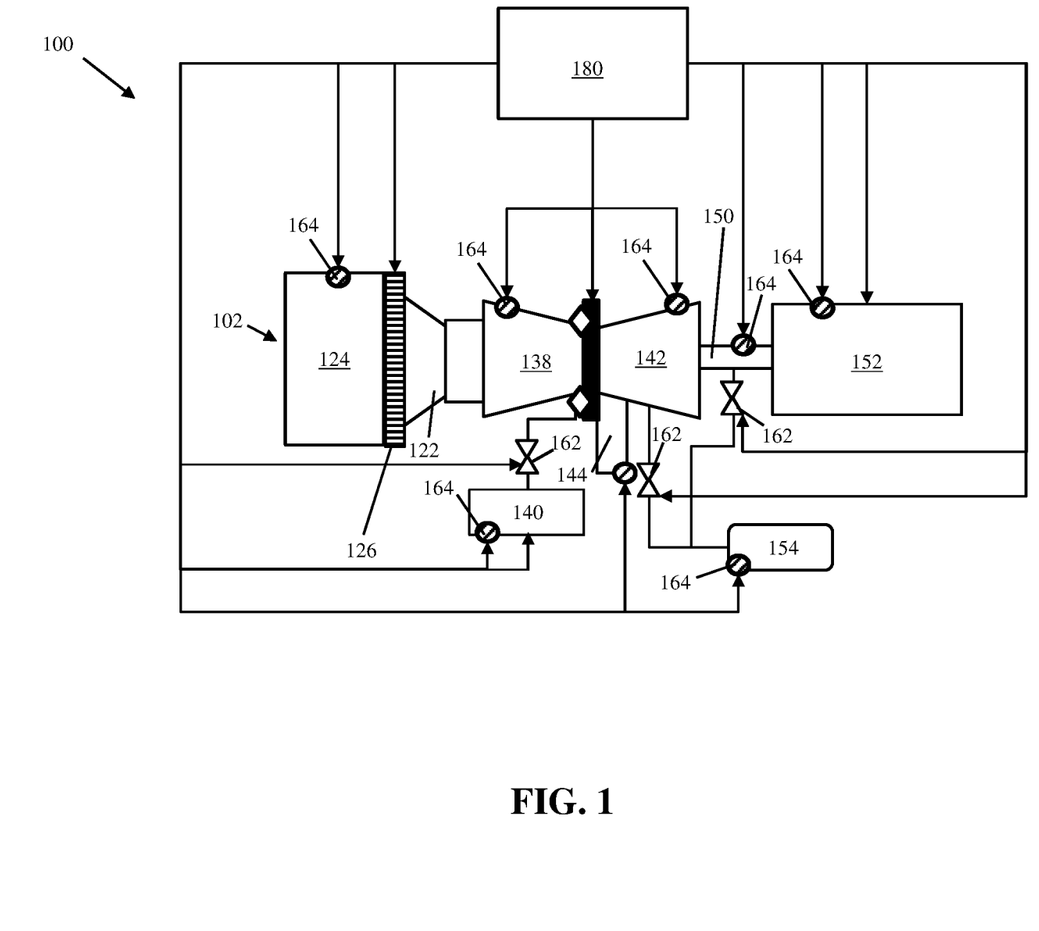
FIG. 1 is a schematic view of a controller, power generation system, and other components configured for use in methods, according to embodiments of the disclosure.

FIG. 1 shows a schematic depiction of a power generation system 100 configured for implementing various embodiments of the disclosure. Power generation system 100 according to one example may include a turbomachine 102 (e.g., a gas turbine assembly) but other types of power sources and/or assemblies may also be used in embodiments of the disclosure. Turbomachine 102 itself may be one of two, five, ten, one-hundred, or more turbomachines in one power plant, and only one turbomachine assembly is shown in detail in FIG. 1 solely for the sake of example. In one non-limiting example, turbomachine 102 may include a gas turbine, which may include a compressor 122. Compressor 122 compresses an incoming flow of fluid (e.g., air) from an inlet 124 as it flows through compressor 122. Compressor 122 may include a plurality of stages of stator vanes (not shown) and rotating blades (not shown) positioned within compressor 122. The stator vanes and rotating blades positioned within compressor 122 may be configured to aid in moving and/or passing fluid through compressor 122. Compressor 122 may include a set of inlet guide vanes (IGVs) 126. IGVs 126 are a type of adjustable compressor nozzle that is structured specifically to direct the incoming flow of operating fluid onto the rotating blades of compressor 122. IGVs 126 may be adjustable between several positions to affect the flow rate, incident angle, and/or other properties of fluid entering compressor 122. IGVs 126 thus may be capable of affecting the temperature of compressor 122, the power output from power generation system 100, and/or other properties.

Compressor 122 delivers a flow of compressed fluid (e.g., compressed air) to a combustor 138. Combustor 138 mixes the flow of compressed fluid with a pressurized flow of fuel provided by a fuel supply 140 and ignites the mixture to create a flow of combustion gas. The flow of combustion gas is in turn delivered to a turbine component 142, which typically includes a plurality of stages of stator vanes (not shown) and turbine blades (not shown), similar to compressor 122. Exhaust gases from the combustion within combustor 138 may flow to an exhaust component 144. Exhaust component 144 may include various filtration instruments to extract hazardous materials from the exhaust gas, before they reach an interconnected component (e.g., a heat recovery steam generator). The flow of combustion gas drives turbine component 142 to produce mechanical work. The mechanical work produced in turbine component 142 drives compressor 122 via a shaft 150, and may be used to drive a generator 152 (e.g., an external component) configured to generate power. Generator 152 may be electrically coupled to electrical infrastructure for delivering power to customers, e.g., various transmission lines (not shown) via electrical substations, distribution lines, etc.

Various portions of power generation system 100 may also include, or be in fluid communication with, a cooling fluid supply 154 for directing one or more cooling fluids (e.g., air, various refrigerants, etc.) to various components of power generation system 100. Cooling fluid supply 154 in many cases may be a fluid coupling to fluid(s) within compressor 122 for siphoning to other components of power generation system 100. In other types of power generation systems, cooling fluid supply 154 may be a dedicated source of cooling fluids. Cooling fluid supply 154 may be a dedicated supply of fluid, and/or may be connection to ambient air or water. One or more cooling passages, air circuits, etc., may control the flow of cooling fluids from cooling fluid reservoir throughout power generation system 100 to cool compressor 122, turbine component 142, generator 152, and/or other components. The flow of fluids to, from, or within power generation system 100 can be controlled using one or more valves 162. Such fluids may include, e.g., fuel from fuel supply 140, cooling fluids from cooling fluid supply 154, and/or other sources of fluid directed to, from, or within power generation system 100. Each valve 162 may take the form of any currently known or later developed component for controlling the flow of fluid through a line for transmitting the fluid. Regardless of how valve(s) 162 are embodied, one or more variables such as the amount, temperature, flow rate, etc., of operative fluids within turbine component 142 can be affected by adjusting the position of control valve(s) 162 as described herein. Valve(s) 162 can control an amount or fraction of fuel, operative fluid, cooling fluid, etc., circulated to, from, or within power generation system 100. Some valves 162 may take the form of a three-way valve coupled to one or more bypass lines, e.g., structured for allowing a fluid to bypass one or more components of power generation system 100 and/or expelled therefrom.

Power generation system 100, and components connected thereto (e.g., fuel supply 140 and/or cooling fluid supply 154) may include one or more sensors 164 for monitoring of parameters such as mechanical, electrical, and/or chemical parameters. In an example, sensor(s) 164 may be in the form of temperature sensor(s), gas sensor(s), flow sensor(s), pressure sensor(s), and/or other devices for evaluating the properties of power generation system 100 and/or materials therein at a particular location. Sensor(s) 164 may include a fluid concentration sensor, e.g., for detecting concentrations of hazardous and/or explosive fluids such as methane, and/or other materials that are hazardous to power generation system 100 (e.g., corrosive acids and/or gases). In this case, sensor(s) 164 may be located in exhaust component 144 and/or other portions of power generation system 100 where such gases may appear. Sensor(s) 164 for detecting hazardous fluids may include an aspirated sensor, a direct point sensor, a light-based sensor, a catalytic bead sensor, an electrochemical sensor, and/or an ultrasonic sensor.

Sensor(s) 164 in the form of a temperature sensor can include thermometers, thermocouples (i.e., voltage devices indicating changes in temperature from changes in voltage), resistive temperature-sensing devices (i.e., devices for evaluating temperature from changes in electrical resistance), infrared sensors, expansion-based sensors (i.e., sensors for deriving changes in temperature from the expansion or contraction of a material such as a metal), and/or state-change sensors. Sensor(s) 164 in the form of pressure sensors can include barometers, manometers, tactile pressure sensors, optical pressure sensors, ionizing pressure sensors, etc. For calculating flow rate and/or other kinetic properties of the operative fluid, sensor(s) 164 can include, e.g., air flow meters, mass flow sensors, anemometers, etc. Sensor(s) 164 may also derive one or more parameters from other measured quantities, e.g., temperature, pressure, flow rate, etc. These measured quantities, in turn, can be measured at multiple positions of turbine component 142 and/or power generation system 100 and applied to mathematical models of fluid flow through a particular component, e.g., via a controller 180 as described herein. In this case, sensor(s) 164 can include components for measuring variables related to temperature and processing components (e.g., computer software) for prediction and/or calculating values of temperature or other metrics based on the related variables. In general, the term "monitoring" in the context of sensor(s) 164 refers to direct measurement and/or the process of mathematically computing a particular value by direct measurement, predictive modeling, derivation from related quantities, and/or other mathematical techniques for measuring and/or finding a particular quantity. In any event, the conditions measured by each sensor(s) 164 can be indexed, tabulated, etc., according to a corresponding time of measurement, or in a respective location in the case of moveable sensor(s) 164. In some cases, controller 180 can act as a "pseudo-sensor" for calculating (e.g., by estimation or derivation) one or more operating conditions at positions within power generation system 100 which do not include sensor(s) 164.

One or more sensor(s) 164 may include an energy sensor for measuring, e.g., an energy output from power generation system 100 and/or generator 152. Such sensor(s) 164 may be embodied as any currently-known or later-developed instrument for measuring the energy produced by power generation system 100 and/or generator 152 including without limitation, a current sensor, a voltage detector, a magnetometer, a velocity sensors configured to measure a speed of rotation of shaft 150 (including, e.g., optical-based sensors, positional sensors, capacitive sensors, tachometers, etc.), and/or other types of sensors for calculating an amount of energy produced by power generation system 100 and/or generator 152. Sensor(s) 164, regardless of the embodiment(s) used, can be communicatively connected (e.g., electrically and/or wirelessly) to controller 180 to calculate an energy output of power generation system 100 and/or generator 152. In addition, the energy output detected with sensor(s) 164 can be tabulated or otherwise indexed by time of measurement, such that the calculated energy output(s) can be cross-referenced in controller 180 to other parameters monitored with other sensor(s) 164. Controller 180 can calculate energy outputs from power generation system 100 and/or generator 152 which correspond to a set of input conditions, output conditions, etc., monitored with sensor(s) 164.

Power generation system 100 may include a controller 180 configured to monitor and/or control the operation of power generation system 100. Controller 180 may be structurally integrated into power generation system 100, or may be embodied as a separate controller that is in communication with power generation system 100. Controller 180 may be in operational communication with power generation system 100 via any suitable electronic and/or mechanical communication component or technique. Controller 180 and its various components discussed herein each may be a single stand-alone system that functions as part of, or separately from, another power plant control system (e.g., computing device) (not shown) that may control and/or adjust operations and/or functions of power generation system 100. Controller 180 may be operatively coupled to sensor(s) 164, e.g., via one or more electrical couplings, wireless data couplings, etc., to receive information therefrom. The various properties measured with sensor(s) 164 thus may be measured and/or converted into an electrical signal or input relayed to controller 180. In some cases, controller 180 may be in operative communication with valve(s) 162 or other elements of power generation system 100 to adjust its operation in real time. Controller 180 may use sensor(s) 164 to monitor and control the operation of power generation system 100 in a maintenance mode, e.g., to enable or disable various automatic responses to one or more risk parameters as discussed herein.

To implement various control features of the disclosure, controller 180 may be operably coupled to one or more valves 162, such that controller 180 governs the position of valve 162 during operation of power generation system 100. Controller 180, more specifically, can adjust a position of valve 162 based on measurements collected by and/or derived from sensor 164 data. In an example embodiment, controller 180 can adjust a position of valve 162 based on a calibrated performance model using measured values of the operational conditions, energy output, etc., yielded from sensor(s) 164. In addition to directly controlling variables such as temperature, pressure, and fluid flow rate through various portions of power generation system 100, valve 162 can also affect other properties (e.g., increases in volume from thermal expansion, thermal stress, etc.) stemming from the combustion of fuel and/or the routing of cooling fluids through power generation system 100. In addition, controller 180 remains operable to adjust further attributes of power generation system 100, e.g., by controlling the amount of combustion in combustor 138 and/or an amount of cooling fluid drawn from cooling fluid supply 154. To this end, controller 180 can include program code which includes a model for operating power generation system 100 in a maintenance mode. Such a model may include one or more automatic responses to various operational faults, e.g., pressures, temperatures, hazardous fluid concentrations, etc., exceeding a corresponding threshold.

Figure 2:
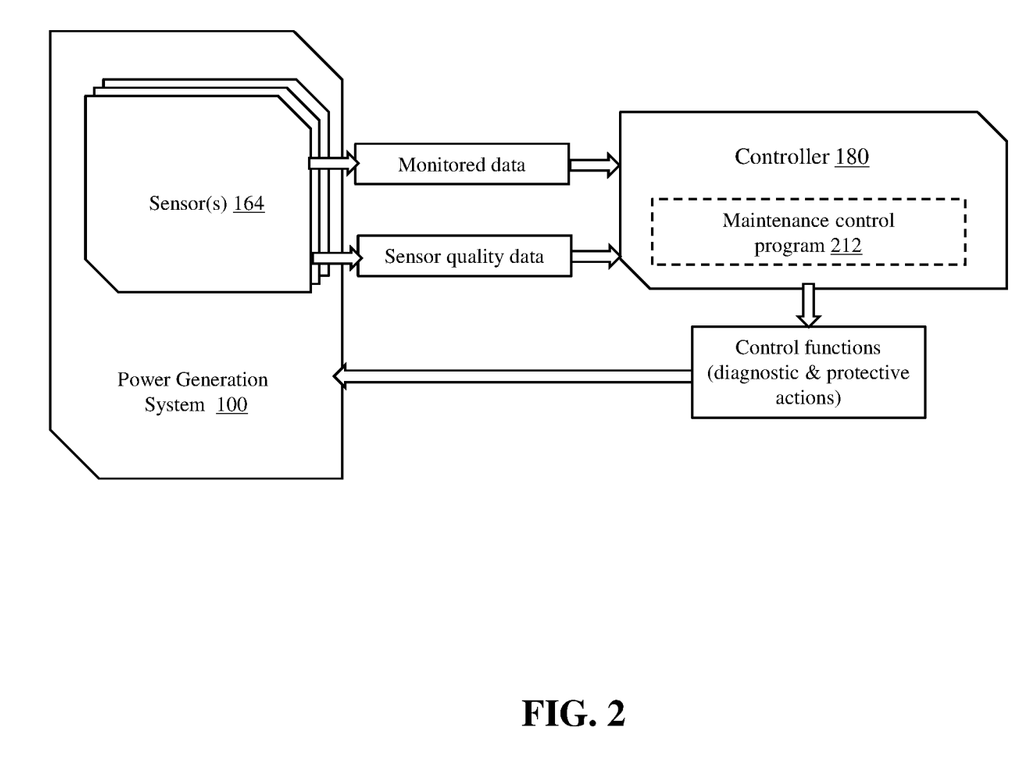
FIG. 2 is a block diagram illustrating the interaction between the controller and power generation system in methods, according to embodiments of the disclosure.

FIG. 2 depicts, in schematic form, various operational interactions between power generation system 100 and controller 180 according to an example implementation. As noted herein, power generation system 100 may be communicatively coupled to controller 180, such that various elements of power generation system 100 provide data to controller 180. Controller 180 may operate on and/or interpret the provided data to affect the operation of power generation system 100. Controller 180 may implement one or more operational methodologies to interact with and/or control power generation system 100. Embodiments of the disclosure may provide an independent process for control of power generation system 100 by controller 180. In some implementations, controller 180 may interact with and/or override an existing methodology for controlling the operation of power generation system 100. Such existing methodologies may operate on the same data as embodiments of the disclosure, or other data received from power generation system 100 and/or other sources. As depicted in the FIG. 2 example, controller 180 may receive monitored data of power generation system 100 (e.g., hazardous fluid concentrations, shaft speeds, air flows, power output levels, etc.) via one or more sensor(s) 164. Controller 180 may additionally or alternatively receive various forms of sensor quality data 164 indicative of, e.g., the fidelity of various types of data collected with sensor(s) 164. The sensor quality data provided to controller 180 may include parameters such as air flow through sensor(s) 164 (e.g., in the case of an aspirational sensor), total time of deployment for various sensor(s) 164, estimated error (e.g., comparing the measurement of several similar sensor(s) 164 with each other and/or comparing expected measurements with actual measurements), and/or other variables indicative of sensor quality.

As discussed herein, a maintenance control program 212 may use the various types of data from power generation system 100 and/or sensor(s) 164 to determine whether it is possible to operate power generation system 100 in a "first maintenance mode." The first maintenance mode refers to any type of on-line maintenance mode in which at least one automatic reaction of controller 180 to an operational fault is disabled. For example, the first maintenance mode may disable an automatic shutdown of power generation system 100 that would otherwise occur when a monitored hazardous fluid concentration, shaft speed, efficiency loss, and/or other parameter exceeds a particular threshold. The first maintenance mode thus may allow continued operation of power generation system 100 with modified (e.g., relaxed) responses to detected faults, but with different safeguards for distinguishing between false positives and actual faults in power generation system 100. In some cases, maintenance control program 212 may also determine whether controller 180 must cause power generation system 100 to operate in a "second maintenance mode," i.e., an operating state in which the automatic response to the operational fault(s) are re-enabled. As noted herein, power generation system 100 may operate the second maintenance mode once controller 180 detects risk parameters in excess of a safety threshold, an override command issued by a user or other component, and/or operation in the first maintenance mode beyond a permitted time limit. In any case, controller 180 may produce control functions (e.g., various diagnostic and protective actions) which directly affect the operation of power generation system 100. In some case, one or more intervening components (e.g., a converter (not shown)) may receive the control functions output from controller 180 to modify the operation of power generation system 100.

Figure 3:
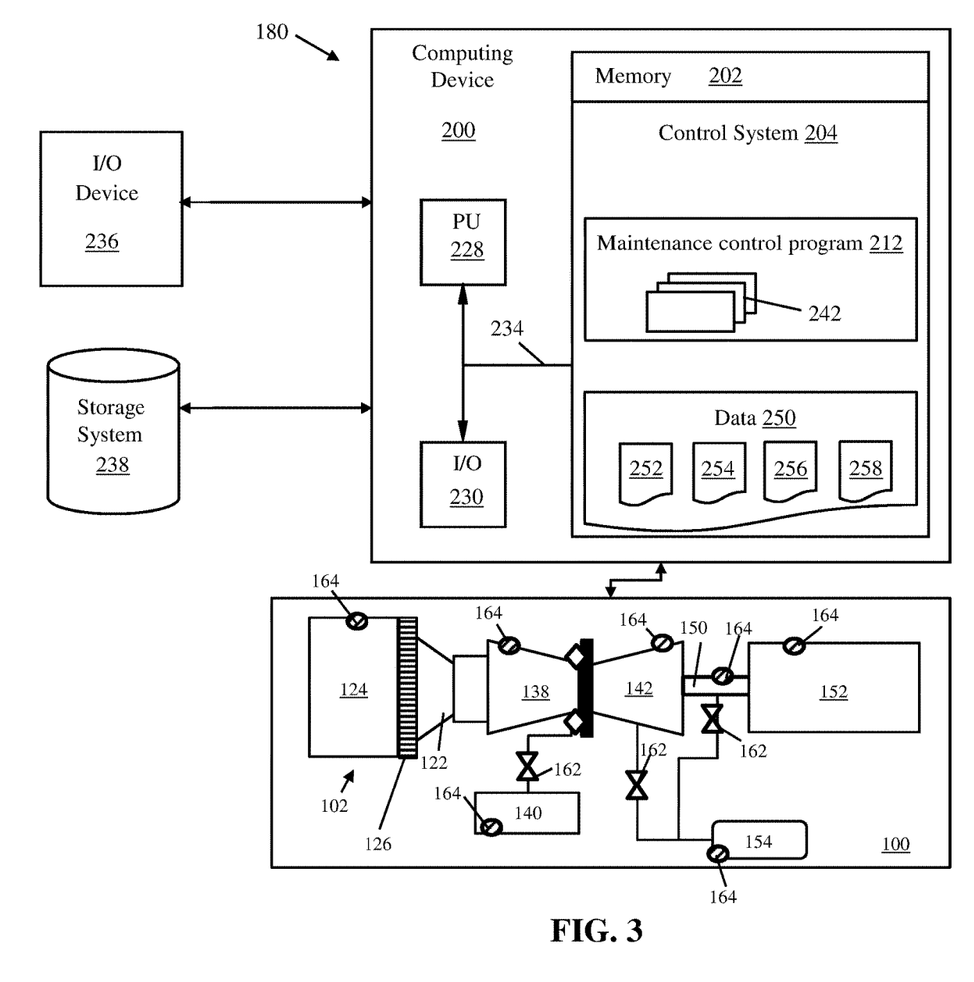
FIG. 3 shows a schematic view of a power generation system, controller, and other components configured for use, according to embodiments of the present disclosure.

Referring to FIG. 3, a schematic depiction of controller 180 and sub-components thereof is illustrated as part of power generation system 100. In the FIG. 3 illustration, only one power generation system 100 is shown in detail, and the operative couplings between controller 180 and various components of power generation system 100 from FIG. 1 are shown only schematically in FIG. 3 for clarity of illustration. As shown, controller 180 may include a computing device 200, which may include a memory 202 with a control system 204 operating thereon. Control system 204 may be a software system integrated with portions of exciter 170, or otherwise in operative communication therewith. Control system 204 may include, e.g., a maintenance control program 212. Maintenance control program 212 may cause controller 180 to act on and/or modify power generation system 100, and/or may modify an existing operational methodology of controller 180 for operating power generation system 100. Controller 180 as shown in FIG. 3 represents one type of hardware for interacting with and/or controlling power generation system 100. As discussed herein, controller 180 may react to various risk parameters and/or other monitored attributes of power generation system 100 to ensure safe and reliable operation of power generation system 100 in a maintenance mode. Within controller 180, maintenance control program 212 may monitor and/or interact with, and in some cases override, other operations that controller 180 undertakes to control power generation system 100 (e.g., adjusting of valves 162, modifying of fuel and/or cooling fluid consumption, etc.) during operation in a maintenance setting.

According to an example, controller 180 may control power generation system 100 during operation in a maintenance setting, and continuously evaluate whether to operate power generation system 100 using a first maintenance mode or a second maintenance mode, each having different responses to various operational faults. Maintenance control program 212 may cause controller 180 to operate power generation system 100 in the first maintenance mode or second maintenance mode, based on multiple criteria including monitored safety risks, time of operation in one or both modes, and/or user override commands. Embodiments of the present disclosure may be configured or operated in part by a technician, computing device 200, and/or a combination of a technician and computing device 200. It is understood that some of the various components shown in FIG. 3 can be implemented independently, combined, and/or stored in memory for one or more separate computing devices that are included in computing device 200. Further, it is understood that some of the components and/or functionality may not be implemented, or additional schemas and/or functionality may be included as part of control system 204.

Computing device 200 can include a processor unit (PU) 228, an input/output (I/O) interface 230, memory 202, and a bus 234. Further, computing device 200 is shown in communication with an external I/O device 236 and a storage system 238. Control system 204 may provide maintenance control program 212, which in turn can operate using various modules 242 (e.g., a calculator, a determinator, a comparator, etc.) for implementing various functions and/or logical steps. The various modules 242 can use algorithm-based calculations, look up tables, and similar tools stored in memory 202 for processing, analyzing, and operating on data to perform their respective functions. In general, PU 228 can execute computer program code to run software, such as control system 204, which can be stored in memory 202 and/or storage system 238. While executing computer program code, PU 228 can read and/or write data to or from memory 202, storage system 238, and/or I/O interface 236. Bus 234 can provide a communications link between each of the components in computing device 200. I/O device 230 can comprise any device that enables a user to interact with computing device 200 or any device that enables computing device 200 to communicate with the equipment described herein and/or other computing devices. I/O device 230 (including but not limited to keyboards, displays, pointing devices, etc.) can be coupled to controller 180 either directly or through intervening I/O controllers (not shown).

Memory 202 can also include various forms of data 250 pertaining to various components of power generation system 100, e.g., various forms of data and/or predetermined data which controller 180 may use as a reference to modify the operation of power generation system 100. Maintenance control program 212 can store and interact with data 250 subdivided into various fields. For example, risk parameter field 252 can store any and all types of data collected by sensor(s) 164 (e.g., hazardous fluid concentrations, shaft speeds, firing temperatures, inlet temperatures, exhaust temperatures, power output, operating efficiency, etc.), which may be used to evaluate the risk of continuing to operate power generation system 100 in the first maintenance mode. Where applicable, risk parameter field 252 may be divided into various sub-fields corresponding to particular types of data. Data 250 may additionally or alternatively include a sensor risk field 254 for storing risk parameters for any sensors 164 (e.g., accuracy of measurement compared to other sensor(s) 164 of power generation system 100 or other system(s) 100, total deployment time, expected remaining useful life, air flow through sensing line(s) of power generation system 100 or sensor(s) 164, etc.)

Multiple maintenance modes that controller 180 may use to operate power generation system 100 for on-line maintenance can be stored in a maintenance mode field 256. Such maintenance modes may include a range of acceptable power outputs, shaft speeds, combustion rates, etc., for selected components of power generation system 100. The maintenance modes more specifically may include operating settings that are specific to only compressor 122, combustor 138, turbine component 142, generator 152, etc., and such settings may be selected for permitting on-line maintenance of specific parts within power generation system 100. Each maintenance mode within maintenance mode field 256, moreover, may include one or more automated responses to at least one operational fault of power generation system 100. An "operational fault" refers to any detected property of power generation system 100 which violates a particular threshold, rule, and/or other requirement. In various examples, operational faults may include hazardous fluid concentrations in excess of an acceptable maximum, shaft speeds that are greater or less than a range of desired levels, firing temperatures that are greater or less than expected or safe operating ranges, etc. The automated responses to an operational fault in each maintenance mode may include, e.g., reducing the firing rate or firing temperature in a combustor, reducing the generator shaft speed and/or power output, purging gas from selected lines, partially or completely shutting down power generation system 100, etc. Maintenance mode field 256 may include a first maintenance mode which disables at least one automated response to an operational fault, and a second maintenance mode which enables the automated response(s) to the operational fault(s).

Data 250 may include one or more risk threshold values for various parameters measured with sensor(s) 164 during operation of power generation system 100 in any of the various maintenance modes. The thresholds may indicate whether it is safe to continue operating power generation system 100 in the first maintenance mode (i.e., with one or more automated responses disabled) under particular circumstances. One or more of the thresholds may be stored in a threshold field 258 of data 200. Such thresholds, in various examples, may include a maximum hazardous fluid concentration (e.g., any hazardous fluid in a concentration of more than approximately one thousand parts per million), a shaft speed above a particular maximum (e.g., approximately 25,000 rotations per minute), and/or other values which indicate that the operation of power generation system 100 may be approaching unsafe conditions.

Computing device 200 can comprise any general purpose computing article of manufacture for executing computer program code installed by a user (e.g., a personal computer, server, handheld device, etc.). However, it is understood that computing device 200 is only representative of various possible equivalent computing devices and/or technicians that may perform the various process steps of the disclosure. In addition, computing device 200 can be part of a larger system architecture operable to model and/or control various aspects and elements of power generation system 100.

To this extent, in other embodiments, computing device 200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 200 may include a program product stored on a computer readable storage device, which can be operative to automatically control other elements of power generation system 100 when executed. Computing device 200 may also take the form of, e.g., a remote monitoring system that is part of a central monitoring system, which in turn is responsible for monitoring several power generation systems 100. In this case, computing device 200 may represent a portion or subcomponent of a central control system.

Figure 4:
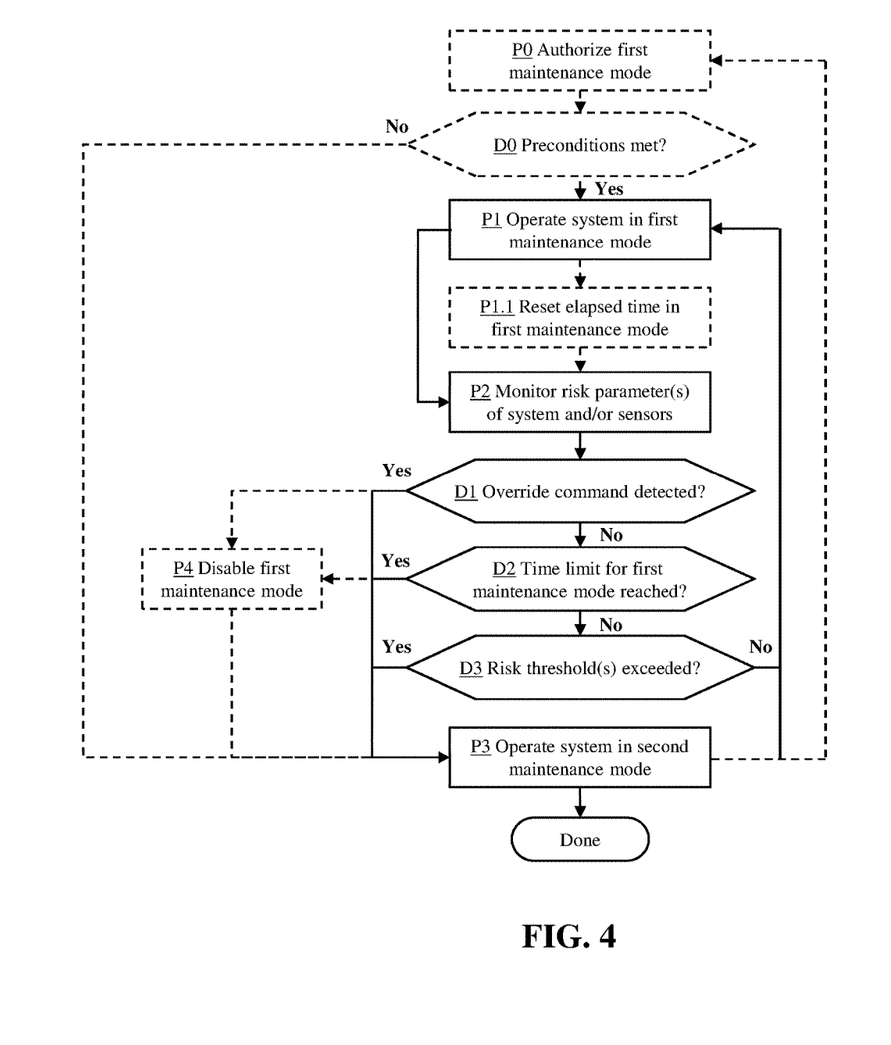
FIG. 4 provides an illustrative flow diagram of a method for controlling a power generation system during on-line maintenance, according to embodiments of the present disclosure.

Referring to FIGS. 3 and 4, embodiments of the disclosure provide a method to control power generation system 100 during operation in an on-line maintenance setting. Power generation system 100 may include, e.g., a power source such as turbomachine 102 for mechanically driving shaft 150 to drive a power output from generator 152. FIG. 4 provides a flow diagram for operating power generation system 100 during on-line maintenance and is described with reference to the FIG. 3 example, but embodiments of the disclosure are equally applicable to other types of power generation systems 100. Embodiments of the methodologies described herein may be implemented, e.g., using controller 180, and/or various modules and/or subcomponents of computing device 200. Methods according to the disclosure may also rely on other components such as controller 180 communicatively coupled to computing device 200 to operate power generation system 100 using various control settings as discussed herein. Power generation system 100 may analyze various properties of power generation system 100 as it operates, and in particular may cause power generation system 100 to shift between a first maintenance mode and a second maintenance mode. The different maintenance modes may affect whether power generation system 100 undertakes one or more automated responses upon detecting an operational fault. The illustrative flow diagram in FIG. 4 is shown with several processes organized in an example flow, but it is understood that one or more processes may be implemented simultaneously and/or sequentially, and/or executed in any alternative order while maintaining the various technical features described by example herein.

In an example implementation, methods according to the disclosure may include process P1 of operating power generation system 100 in the first maintenance mode. Process P1 may be preceded by other operations described herein (e.g., process P0 of authorizing the first maintenance mode and/or determining whether power generation system 100 meets preconditions in decision D0), and the details of these processes are discussed elsewhere herein. Process P1 may include using controller 180 to shift the operation of power generation system 100 from a non-maintenance mode (or the second maintenance mode, when the method is implemented in a loop) to the first maintenance mode. Such a shift may include adjusting valve(s) 162 and/or other characteristics of power generation system 100 to affect the power output, combustion temperature, shaft rotation speed, cooling fluid flow, and/or other properties of power generation system 100 to permit maintenance (e.g., repair, replacement, servicing of parts, etc.) while power generation system 100 continues to operate. In the first maintenance mode, maintenance control program 212 of controller 180 may disable one or more automated responses to a corresponding operational fault within power generation system 100. The disabled responses may be designated via modules 242, and/or may be set forth within maintenance mode field 256 of data 250. According to an example implementation, operating power generation system 100 in the first maintenance mode may disable an automatic response of temporarily shutting down power generation system 100 in response to detecting more than one-thousand, five-hundred parts per million of a hazardous fluid. Power generation system 100 may continue to operate in the first maintenance mode as maintenance control program 212 implements further processes of the disclosure, except where controller 180 changes the maintenance mode, as noted herein.

In some cases, an operator or administrator of power generation system 100 may limit the amount of time that power generation system 100 is able to operate in the first maintenance mode. To provide this feature, embodiments of the disclosure may include setting and enforcing a total time limit in which power generation system 100 may operate in the first maintenance mode. The time limit for operating in the first maintenance mode may be stored, e.g., in maintenance mode field 256 of data 250. In this case, power generation system 100 may be allowed to operate in the first maintenance mode for the duration of the time limit before being automatically switched to operating in the second maintenance mode without analysis of risk parameters and/or other operating characteristics.

In various implementations, the same time limit may apply to a total elapsed time for multiple instances of operating power generation system 100 in the first maintenance mode. Thus, past periods of operation in the first maintenance mode will count toward the time limit. The elapsed time may only be reset on designated days, e.g., after two weeks, one month, three months, six months, one year, etc. In an example, the time limit for the first maintenance mode may be five-hundred hours of total operating time in the first maintenance mode. The elapsed time may be reset to zero only once per year in such an example. Thus, the time limit may be reached after fifty instances of power generation system 100 operating in the first maintenance mode for ten hours at a time, or after a single instance of operating power generation system 100 in the first maintenance mode for five-hundred hours. After a prescribed time period elapses, or an administrator of power generation system 100 otherwise allows the elapsed time to be reset, embodiments of the disclosure optionally may include process P1.1 (shown in phantom) of resetting the elapsed time of operation in the first maintenance mode. Resetting the elapsed time may include, e.g., modules 242 of maintenance control program 212 archiving the current value of an "elapsed time" variable in data 250 and/or replacing it with zero. In cases where the prescribed period has not elapsed, and/or an administrator of power generation system 100 has not authorized resetting the elapsed time, process P1.1 is omitted or skipped.

While power generation system 100 continues to operate in the first maintenance mode, methods of the disclosure may include process P2 of monitoring various risk parameters of power generation system 100 and/or sensor(s) 164. The monitoring of risk parameters in process P2 may be implemented, e.g., using sensor(s) 164, and/or analysis of other properties of power generation system 100 (e.g., power output, operating time, etc.) without the aid of sensor(s) 164. As used herein, the term "risk parameters" can refer to any conceivable property and/or group of properties (including, e.g., mechanical, electrical, and/or chemical data) indicative of whether power generation system 100 is approaching unsafe operation. Example risk parameters of power generation system 100 to be analyzed may include, without limitation, shaft speed, one or more temperatures, internal vibrations, fluid purity, purge fluid flow, fluid pressure, power output, flame detection parameters, fluid flow rates, etc. Example risk parameters for sensor(s) 164 similarly may include, e.g., a sensor quality for a gas sensor in fluid communication with a sensing line. In this case, sensor quality may refer to the variance between one sensor 164 and other sensors 164, the total deployment time and/or expected useful life of sensor(s) 164, availability of sensor(s) 164 as power generation system 100 operates, etc. The risk parameters may be direct measurements of sensor 164, and/or may be based on present data, historical operating data, models of power generation system 100, projected operating settings and/or parameters of power generation system 100, etc. In further implementations, maintenance control program 212 of controller 180 may simulate these and other monitored risk parameters of power generation system 100 based on monitored via sensors 164. In further processing, maintenance control program 212 of controller 180 may use the monitored risk parameters to evaluate whether to continue operating power generation system 100 in the first maintenance mode, or shift power generation system 100 to a second maintenance mode.

As power generation system 100 continues to operate in the first maintenance mode, with continued monitoring of risk parameters for system 100 and/or sensor(s) 164, methods of the disclosure include determining whether to continue the operation in the first maintenance mode. To maintain safe and reliable operation of power generation system 100, further operation in the first maintenance mode (i.e., with one or more automatic responses to operational faults disabled) is contingent on compliance with various technical and/or user-determined requirements. An example of such requirements are shown in the example flow diagram as decision nodes D1, D2, and D3.

At decision D1, modules 242 can determine whether an operator or administrator of power generation system 100 has issued an override command. The override command may be any input to controller 180 (e.g., provided via I/O device 236) which instructs maintenance control program 212 to stop operating in the first maintenance mode, and begin operating in the second maintenance mode. In some cases, the override command may be issued automatically by maintenance control program 212 itself, e.g., by reference to external control programs and/or devices in communication with controller 180. Where an override command is detected (i.e., "Yes" at decision D1), the method may proceed immediately to process P3 of operating power generation system 100 in the second maintenance mode, and/or implement further optional processes (e.g., disabling the first maintenance mode in process P4). In cases where no override command is detected (i.e., "No" at decision D1), the method may proceed to further analysis of whether to maintain operation in the first maintenance mode.

At decision D2, modules 242 can determine whether the elapsed operating time (e.g., the total operating time for the current instance of the first maintenance mode plus past instances of using the first maintenance mode) exceeds a time limit for operating power generation system 100 in the first maintenance mode. As noted elsewhere herein, the time limit may be, for example, approximately five hundred hours of total operation in the first maintenance mode. In this case, an elapsed time of less than five hundred hours for a single instance of using the first maintenance mode may exceed the time limit if power generation system 100 previously has used the first maintenance mode without initializing the time limit (e.g., in process P1.1). If the time limit for the first maintenance mode has been reached (i.e., "Yes" at decision D2), the method may continue to process P3, and/or process P4 or other operations as noted herein. If the time limit for the first maintenance mode has not been reached (i.e., "No" at decision D2) the method may proceed to analysis of the risk parameter(s) monitored in process P2.

At decision D3, modules 242 of maintenance control program 212 may evaluate whether any risk parameters of power generation system 100 or sensor(s) exceed their corresponding risk threshold(s). The relevant threshold(s) for each monitored risk parameter may be stored and organized in threshold field 258 of data 250 as noted elsewhere herein. The corresponding risk threshold(s) may not indicate that power generation system 100 is in violation of a safety limit or otherwise malfunctioning, but simply may indicate that its operation is starting to approach a level that requires heightened scrutiny. According to an example, modules 242 of maintenance control program 212 may evaluate whether a hazardous fluid concentration in one or more portions of turbomachine 102 exceeds a designated safe level (e.g., one-thousand parts per million). Decision D3 in some cases may include determining whether a predetermined number and/or percentage of selected risk parameters exceeds their corresponding thresholds. In cases where the risk parameter(s) exceed the corresponding risk threshold(s) (i.e., "Yes" at decision at D3), the method may proceed to further operations to operate power generation system 100 in the second maintenance mode. In cases where the risk parameter(s) do not exceed the corresponding risk threshold(s) (i.e., "No" at decision D3), controller 180 will maintain its operation of power generation system 100 in the first maintenance mode. Thus, the automatic response to one or more operational faults will remain disabled only when each of decisions D1, D2, D3 output a "No."

Where any of decision nodes D1, D2, D3 output a "No," methods according to the disclosure may include process P3 of operating power generation system 100 in a second maintenance mode, instead of the above-noted first maintenance mode. Process P3 may include, e.g., using controller 180 to shift the operation of power generation system 100 from the first maintenance mode to the second maintenance mode. Such a shift may maintain substantially the same power output, combustion temperature, shaft rotation speed, and/or other properties of power generation system 100 to permit maintenance (e.g., repair, replacement, servicing of parts, etc.) while power generation system 100 continues to operate. However, in the second maintenance mode, maintenance control program 212 of controller 180 may enable or re-enable one or more automated responses to a corresponding operational fault within power generation system 100. As noted herein, such responses may be designated via modules 242, and/or may be set forth within maintenance mode field 256 of data 250. According to an example implementation, operating power generation system 100 in the first maintenance mode may disable an automatic response of temporarily shutting down power generation system 100 in response to detecting more than one-thousand five-hundred parts per million of a hazardous fluid. Power generation system 100 may continue to operate in the second maintenance mode as maintenance control program 212 implements further processes of the disclosure, except where controller 180 changes the maintenance mode as noted herein. The method may conclude ("Done") when power generation system 100 begins operating in the second maintenance mode, or may return to other processes (e.g., process P1 or optional process P0 as discussed below) to possibly resume operation in the first maintenance mode.

In some cases, an operator or administrator of power generation system 100 may wish to prevent further operation in the first maintenance mode, e.g., when the time limit has been reached and/or when any other circumstances require heightened scrutiny during maintenance (e.g., operator preference and/or particular risk thresholds being exceeded). To accommodate these circumstances, methods of the disclosure optionally include disabling further use of the first maintenance mode in process P4. The disabling may include, e.g., modules 242 automatically overriding further requests to enable the first maintenance mode in decision D1, or otherwise preventing further operation in the first maintenance mode without re-initializing controller 180 or overriding instructions from a user, operator, etc. After the first maintenance mode is disabled, the method may continue to process P3 of operating power generation system 100 in the second maintenance mode as described elsewhere herein.

In some cases, methods according to the disclosure may include an optional process P0 of authorizing the first maintenance mode before other actions (e.g., processes P1, P2, decisions D1, D2, D3) may be implemented. Process P0 may occur, e.g., before any other processes of the disclosure are implemented, or only after power generation system 100 begins operating in the second maintenance mode. Process P0 may include, e.g., preventing maintenance control program 212 from implementing any processes according to the disclosure until the first maintenance mode is authorized. The authorization may be manual (e.g., input to controller 180 by an operator of power generation system 100), or may be automatic (e.g., based on signals from interconnected control devices and/or an automatic authorization by maintenance control program 212).

Following process P0, the method may continue to decision D0 in which modules 242 determine whether one or more preconditions for operating in the first maintenance mode have been met. The preconditions may include, or be the same as, the risk threshold(s) analyzed in decision D3. Additionally or alternatively, one or more of the preconditions to be analyzed in decision D0 may be different from the risk threshold(s) of decision D3. In the example of hazardous fluid monitoring, decision D0 may include determining whether the hazardous fluid concentration within portions of turbomachine 102 is less than seven-hundred and fifty parts per million (i.e., half of the example risk threshold). The precondition(s) may additionally or alternatively include other requirements, e.g., the elapsed time in the first operating mode not having previously exceeded the time limit before resetting of the elapsed time is allowed. If the preconditions are not met (i.e., "No" at decision D0), the method may proceed immediately to process P3 of operating power generation system 100 in the second maintenance mode, and/or resuming such operation where applicable. In cases where the precondition(s) is/are met, the method may continue to process P1 and subsequent operations discussed herein.

Technical effects of the embodiments described herein include accommodating multiple levels of scrutiny for operation of a power generation system during on-line maintenance. In particular, methods of the disclosure cause power generation system 100 to operate with reduced scrutiny during maintenance, via a first operating mode. The first operating mode prevents shutdowns or other responses to operational faults, when such faults are unlikely to be caused by systemic problems. The disclosure automatically increases the scrutiny in cases where an operator overrides the first maintenance mode, reduced scrutiny is permitted for a prescribed time, or where risk parameters exceed corresponding thresholds. Embodiments of the disclosure thus provide multiple forms of operation during on-line maintenance, to automatically accommodate higher and lower need for scrutiny in different circumstances.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for controlling a power generation system during on-line maintenance, the method comprising:
modeling the power generation system in a first maintenance mode and a second maintenance mode;
operating the power generation system in the first maintenance mode,
wherein the operating the power generation system in the first maintenance mode causes a controller of the power generation system to programmatically disable an automated response to at least one operational fault of the power generation system,
wherein modeling the power generation system determines the automated response to the at least one operational fault of the power generation system;
calculating an elapsed time of operating the power generation system in the first maintenance mode, wherein calculating the elapsed time includes accumulating time from previous instances of operating in the first maintenance mode;
monitoring a risk parameter of the power generation system or at least one sensor within the power generation system while operating the power generation system in the first maintenance mode; and
operating the power generation system in the second maintenance mode in response to detecting the elapsed time in the first maintenance mode exceeding a time limit, or the monitored risk parameter exceeding a safety threshold,
wherein operating the power generation system in the second maintenance mode causes the controller of the power generation system to programmatically enable the automated response to the at least one operational fault of the power generation system,
wherein modeling the power generation system determines the time limit of the elapsed time and the safety threshold of the monitored risk parameter.

2. The method of claim 1, wherein the monitored risk parameter includes a hazardous fluid concentration within a sensing line of the power generation system, or each of an air flow within the sensing line and a sensor quality for a gas sensor in fluid communication with the sensing line of the power generation system.

3. The method of claim 1, further comprising maintaining operation of the power generation system in the first maintenance mode in response to not detecting the elapsed time in the first maintenance mode not exceeding a time limit, and the monitored risk parameter not exceeding the safety threshold.

4. The method of claim 1, further comprising, while operating the power generation system in the second maintenance mode:
in response to detecting an authorization to operate the power generation system in the first maintenance mode, determining whether the power generation system complies with a set of preconditions for the first maintenance mode;
operating the power generation system in the first maintenance mode in response to the power generation system complying with the set of preconditions; and
maintaining operation of the power generation system in the second maintenance mode in response to the power generation system not complying with the set of preconditions.

5. The method of claim 1, wherein the monitored risk parameter includes a plurality of risk parameters each having a corresponding safety threshold.

6. The method of claim 1, further comprising disabling further operation of the power generation system in the first maintenance mode in response to detecting the elapsed time in the first maintenance mode exceeding the time limit.

7. The method of claim 1, further comprising disabling further operation of the power generation system in the first maintenance mode in response to detecting an override command.

8. A program product stored on a non-transitory computer readable storage medium for controlling a power generation system during on-line maintenance, the computer readable storage medium comprising program code for causing a computer system to perform actions including:
modeling the power generation system in a first maintenance mode and a second maintenance mode;
operating the power generation system in the first maintenance mode,
wherein the operating the power generation system in the first maintenance mode causes a controller of the power generation system to programmatically disable an automated response to at least one operational fault of the power generation system,
wherein modeling the power generation system determines the automated response to the at least one operational fault of the power generation system;
calculating an elapsed time of operating the power generation system in the first maintenance mode, wherein calculating the elapsed time includes accumulating time from previous instances of operating in the first maintenance mode;
monitoring a risk parameter of the power generation system or at least one sensor within the power generation system while operating the power generation system in the first maintenance mode; and
operating the power generation system in the second maintenance mode in response to detecting the elapsed time in the first maintenance mode exceeding a time limit, or the monitored risk parameter exceeding a safety threshold,
wherein operating the power generation system in the second maintenance mode causes the controller of the power generation system to programmatically enable the automated response to the at least one operational fault of the power generation system,
wherein modeling the power generation system determines the time limit of the elapsed time and the safety threshold of the monitored risk parameter.

9. The program product of claim 8, wherein the monitored risk parameter includes a hazardous fluid concentration within a sensing line of the power generation system, or each of an air flow within the sensing line and a sensor quality for a gas sensor in fluid communication with the sensing line of the power generation system.

10. The program product of claim 8, further comprising program code for maintaining operation of the power generation system in the first maintenance mode in response to not detecting the elapsed time in the first maintenance mode not exceeding a time limit, and the monitored risk parameter not exceeding the safety threshold.

11. The program product of claim 8, further comprising program code for actions including, while operating the power generation system in the second maintenance mode:
in response to detecting an authorization to operate the power generation system in the first maintenance mode, determining whether the power generation system complies with a set of preconditions for the first maintenance mode;
operating the power generation system in the first maintenance mode in response to the power generation system complying with the set of preconditions; and
maintaining operation of the power generation system in the second maintenance mode in response to the power generation system not complying with the set of preconditions.

12. The program product of claim 8, wherein the monitored risk parameter includes a plurality of risk parameters each having a corresponding safety threshold.

13. The program product of claim 8, further comprising program code for disabling further operation of the power generation system in the first maintenance mode in response to detecting the elapsed time in the first maintenance mode exceeding the time limit.

14. The program product of claim 8, further comprising program code for disabling further operation of the power generation system in the first maintenance mode in response to detecting an override command.

15. A system comprising:
- a power generation system configured to operate in an on-line maintenance setting;
- a system controller in communication with the power generation system, the system controller being configured to perform actions during operation of the power generation system in the on-line maintenance setting, the actions including:
  - model the power generation system in a first maintenance mode and a second maintenance mode;
  - operate the power generation system in the first maintenance mode,
  - wherein the operating the power generation system in the first maintenance mode causes a controller of the power generation system to programmatically disable an automated response to at least one operational fault of the power generation system,
  - wherein modeling the power generation system determines the automated response to the at least one operational fault of the power generation system;
  - calculate an elapsed time of operating the power generation system in the first maintenance mode, wherein calculating the elapsed time includes accumulating time from previous instances of operating in the first maintenance mode;
  - monitor a risk parameter of the power generation system or at least one sensor within the power generation system while operating the power generation system in the first maintenance mode; and
  - operate the power generation system in the second maintenance mode in response to detecting the elapsed time in the first maintenance mode exceeding a time limit, or the monitored risk parameter exceeding a safety threshold,
  - wherein operating the power generation system in the second maintenance mode causes the controller of the power generation system to programmatically enable the automated response to the at least one operational fault of the power generation system,
  - wherein modeling the power generation system determines the time limit of the elapsed time and the safety threshold of the monitored risk parameter.

16. The system of claim 15, wherein the monitored risk parameter includes a hazardous fluid concentration within a sensing line of the power generation system, or each of an air flow within the sensing line and a sensor quality for a gas sensor in fluid communication with the sensing line of the power generation system.

17. The system of claim 15, wherein the system controller is further configured to maintain operation of the power generation system in the first maintenance mode in response to not detecting the elapsed time in the first maintenance mode not exceeding a time limit, and the monitored risk parameter not exceeding the safety threshold.

18. The system of claim 15, wherein the system controller is further configured, while operating the power generation system in the second maintenance mode, to perform actions including:
- in response to detecting an authorization to operate the power generation system in the first maintenance mode, determine whether the power generation system complies with a set of preconditions for the first maintenance mode;
- operate the power generation system in the first maintenance mode in response to the power generation system complying with the set of preconditions; and
- maintain operation of the power generation system in the second maintenance mode in response to the power generation system not complying with the set of preconditions.

19. The system of claim 15, wherein the monitored risk parameter includes a plurality of risk parameters each having a corresponding safety threshold.

20. The system of claim 15, wherein the system controller is further configured to disable further operation of the power generation system in the first maintenance mode in response to detecting the elapsed time in the first maintenance mode exceeding the time limit.

* * * * *